United States Patent
Nakamura et al.

[11] Patent Number: 5,894,653
[45] Date of Patent: Apr. 20, 1999

[54] METHOD OF MACHINING MOTOR FRAME BODY AND MOTOR MACHINED BY THE METHOD

[75] Inventors: Kosei Nakamura, Oshino-mura; Akio Sadatsuki, Minamitsuru-gun; Yukio Katsuzawa, Kawaguchiko-machi; Michi Masuya, Oshinu-mura, all of Japan

[73] Assignee: Fanuc Ltd., Minamitsuru, Japan

[21] Appl. No.: 08/765,685

[22] PCT Filed: May 23, 1996

[86] PCT No.: PCT/JP96/01371

§ 371 Date: Jan. 8, 1997

§ 102(e) Date: Jan. 8, 1997

[87] PCT Pub. No.: WO96/37942

PCT Pub. Date: Nov. 28, 1996

[30] Foreign Application Priority Data

May 23, 1995 [JP] Japan .................. 7-123776
Aug. 17, 1995 [JP] Japan .................. 7-209712

[51] Int. Cl.⁶ .................................. H02K 15/14
[52] U.S. Cl. .................................. 29/596; 310/42
[58] Field of Search .................. 29/596; 310/42, 310/90, 89; 82/1.11, 165

[56] References Cited

U.S. PATENT DOCUMENTS 5,678,299 10/1997 Mochizuki ..................... 29/596
5,758,404 6/1998 Baumann ....................... 29/596

FOREIGN PATENT DOCUMENTS 61-285047 12/1986 Japan .
63-194544 8/1988 Japan .

*Primary Examiner*—Daniel B. Moon
*Assistant Examiner*—James P. Calve
*Attorney, Agent, or Firm*—Staas & Halsey

[57] ABSTRACT

A stator (76), a rotor (82), and frame bodies (84, 86) to fixedly hold a stator core (74) therebetween in an axial direction are assembled into a motor. Further, a shaft (78) of the rotor and the frame body (86) are mutually coupled through a coupler (106) with no ability for relative rotation. While integrally rotating the frame bodies (84, 86), the stator (76), and the rotor (82) forming the motor about an axis of the rotor (82), a lathe is used to machine mounting surfaces (96a, 100a) of the frame body (84), which will be in direct contact with a surface of an object on which the motor is mounted.

6 Claims, 5 Drawing Sheets

METHOD OF MACHINING MOTOR FRAME BODY AND MOTOR MACHINED BY THE METHOD

TECHNICAL FIELD

This invention relates to a method of machining a mounting surface of a motor frame body, which is to be in direct contact with a surface of an object to which a motor is mounted, and to a motor for which the method of machining the mounting surface is applied.

BACKGROUND ART

Referring to FIGS. 2 and 3, a description will now be given of one illustrative method of machining (specially finishing) a mounting surface of a motor frame body, and one illustrative motor for which the method of machining is applied.

The motor includes a stator 14 having a stator core 12 with a winding 10 wound thereon, a rotor 20 having a rotor core 18 secured to a shaft 16, and a frame body (i.e., a front frame 22 and a rear frame 24) to fixedly hold the stator core 12 therebetween in an axial direction.

The stator core 12 and the rotor core 18 include a laminated product of magnetic thin film such as silicon steel plate. The front frame 22 and the rear frame 24 include ring-like members made of metal such as aluminum. A ring-like front bearing housing 30 and a ring-like rear bearing housing 32 are respectively fixedly disposed in central openings 26 and 28 provided in the frames 22 and 24. Both the bearing housings 30 and 32 rotatably support the shaft 16 through a front bearing 34 and a rear bearing 36. It is thereby possible to rotatably support the rotor 20 by the front frame 22 and the rear frame 24 while forming fine clearances between an outer peripheral surface of the rotor core 18 and an inner peripheral surface of the stator core 12.

The central opening 26 in the front frame 22 has a smaller inner diameter than an outer diameter of the rotor 20, and the central opening 28 in the rear frame 24 has a larger inner diameter than the outer diameter of the rotor 20. Therefore, in the motor assembling process, the stator 14 is first fixed to the front frame 22 on which the front bearing housing 30 is previously mounted, and the rear frame 24 with the rear bearing housing removed therefrom. Subsequently, the rotor 20 with the front bearing 34 and the rear bearing 36 secured to the vicinity of both ends of the shaft 16 is inserted into the stator 14 through the central opening 28 in the rear frame 24. After the front bearing 34 is inserted into the front bearing housing 30, the rear bearing housing 32 is inserted into the central opening 28 in the rear frame 24 to be fixed to the rear frame 24 while inserting the rear bearing 36 into the rear bearing housing 32. The front bearing housing 30 serves as a spacer to smooth a difference in diameter between the central opening 26 in the front frame 22 and the front bearing 34. Thus, the front bearing housing 30 may appropriately be replaced or omitted depending upon a variation in dimension of the front bearing, which is required according to an operating specification of the motor.

The front frame 22 is disposed on the side of a load of the shaft 16, and is provided with a flange 38 radially outwardly extending from its front end spaced apart from the stator core 12. The flange 38 forms a mounting area for mounting the motor on an object, and has through-holes 40 into which mounting bolts (not shown) are inserted. Further, the front frame 22 is provided with a cylindrical socket portion 42 axially forwardly extending beyond the flange 38. The socket portion 42 engages a peripheral edge of a motor receiving hole provided in the object (not shown) on which the motor is mounted, resulting in relative alignment (such as centering) between the shaft 16 and a driven body.

In the front frame 22, an axial front end surface 38a of the flange 38 and a radial outer peripheral surface 42a of the socket portion 42 are machined for a surface finish to serve as mounting surfaces to make direct contact with the surface of the object on which the motor is mounted, and enable mounting of the motor with a relationship appropriately maintained between the shaft 16 and the driven body. In the prior-art motor assembling/manufacturing process, the finishing operation has been carried out according to the following procedure.

As shown in FIG. 3, the front frame 22 and the rear frame 24 are fixed to the stator core 12 with the winding 10 mounted thereon through a plurality of tie-bolts 44. Subsequently, the stator core 12 is mounted to a lathe (not shown) while supporting an inner peripheral portion of the stator core 12 by a jig (not shown). Then, the front frame 22 and the rear frame 24 fixed on the stator core 12 are rotated about an axis of the stator core 12 so that the mounting surfaces of the front frame 22 and the rear frame 24 are able to be cut by the lathe. Specifically, a concurrent surface finish is made to the axial front end surface 38a of the flange 38 and the radial outer peripheral surface 42a of the socket portion 42 in the front frame 22, and to an inner peripheral surface 26a of the central opening 26 in the front frame 22 and a mounting end surface 26b, which serve to support the front bearing housing 30, in the vicinity of the opening. It is also possible to finish a peripheral surface 28a of the central opening 28 in the rear frame 24 and a mounting end surface 28b in the vicinity of the opening so as to support the rear bearing housing 32 at an appropriate position.

The front bearing housing 30 is finished, in different steps, for an outer peripheral surface 30a to make contact with the inner peripheral surface 26a of the central opening 26 in the front frame 22, an end surface 30b to make contact with the mounting end surface 26b of the front frame 22, and an inner peripheral surface 30c and an end surface 30d to make contact with an outer peripheral surface 46a and a bearing end surface 46b of an outer ring 46 for the front bearing 34. Further, in different steps, the rear bearing housing 32 is finished for an outer peripheral surface 32a and an end surface 32b to make contact with the inner peripheral surface 28a and the mounting end surface 28b of the central opening 28 in the rear frame 24, and an inner peripheral surface 32c to make contact with an outer peripheral surface 48a of an outer ring 48 for the rear bearing 36. For both the bearings 34 and 36, their inner rings 50 and 52 are fixed on the shaft 16 in advance. Further, turning is made in advance to a peripheral surface of the shaft 16 with respect to center holes 54 provided in its both ends.

After the completion of finishing of each member, the motor assembling process is started. That is, the front bearing housing 30 is fitted into the central hole 26 in the front frame 22 with a clearance to be fixed to the front frame 22 by bolts 56. Next, the rotor 20 is inserted into the stator 14 from the side of the rear frame 24 to mount the front bearing 34 fixed to the shaft 16 on the front bearing housing 30 through clearance fitting. Subsequently, while mounting the rear bearing 36 fixed to the shaft 16 on the rear bearing housing 32 through clearance fitting, the rear bearing housing 32 is fitted into the central opening 28 in the rear frame 24 with a clearance to be fixed to the rear frame 24 through bolts 58. Thus, the motor assembling process is completed.

In the above method of finishing, the mounting surfaces (i.e., the front end surface 38a and the outer peripheral surface 42a of the front frame 22) are machined with reference to an axis of the stator 14. Therefore, it is essential to accurately align the axis of the stator 14 with an axis of the rotor 20 when the rotor 20 is mounted on the front frame 22 and the rear frame 24. In the motor assembled after the completion of machining of the mounting surfaces, the stator axis and the rotor axis may slightly be deviated from one another. In this case, even if the mounting surfaces are finished with high accuracy, and the motor is accurately mounted on the object, it is difficult to obtain the appropriate relationship between the shaft 16 of the motor and the driven body. In particular, in case of a so-called direct-coupled machine structure in which a main shaft of a machine tool is directly coupled to the shaft 16 of the motor (i.e., when the main shaft of the machine tool serves as the driven body), serious damage is caused to reliability of the operation of the machining unless the shaft 16 and the main shaft are accurately positioned (i.e., aligned).

In the assembly of the motor, in order to accurately align the stator axis with the rotor axis, it is sufficient to respectively tightly fit the bearings 34 and 36 into the bearing housings 30 and 32, and the bearing housings 30 and 32 into the frames (the front frame 22 and the rear frame 24). However, as shown in FIG. 3, the bearings 34 and 36 are fixed in advance on the shaft 16 of the rotor 20. Hence, in the fixed state, it is extremely difficult to tightly fit the bearings 34 and 36 into the bearing housings 30 and 32, and tightly fit the bearing housings 30 and 32 into the front frame 22 and the rear frame 24, resulting in a significant deterioration of assembling workability.

Therefore, in the prior art, the clearance fitting is provided between the bearings 34, 36 and the bearing housings 30, 32, and between the bearing housings 30, 32 and the frame bodies 22, 24. As a result, such slight misalignment as mentioned above tends to be easily generated between the stator axis and the rotor axis.

Further, the above finish is made to the mounting surfaces in a state in which the rotor 20 is not mounted on the frame body (the front frame 22 and the rear frame 24). Consequently, for assembly of the motor, it is necessary to mount the rotor 20 on the frame body after the completion of the finish. For this purpose, in the motor, the central opening 28 having a larger diameter than an outer diameter of the rotor 20 is formed at least one (the rear frame 24 in the embodiment of FIGS. 2 and 3) of the frame bodies (the front frame 22 and the rear frame 24) to be disposed at axial both ends of the stator 14 so as to insert the rotor 20 into the stator 14, and the discrete bearing housing 32 is mounted in the central opening 28. However, in the motor finished as described above, there are problems of increases in the number of parts and the number of steps in the assembling process.

DISCLOSURE OF THE INVENTION

It is an object of the present invention to provide a method of machining a motor frame body, in which a mounting surface of the frame body is machined without loss of motor assembling workability while reducing misalignment between a stator axis and a rotor axis as much as possible, and a shaft of a rotor and a driven body are mutually accurately aligned to achieve a highly accurate coupling. It is another object of the present invention to provide a motor in which the method of machining is used, a structure is simplified, and the number of parts and the number of steps in assembly are reduced.

In order to achieve the above objects, in a method of machining a motor frame body according to the present invention, a stator is first fixed to a frame body, and a rotor is rotatably mounted on the frame body through bearings, thereby assembling the motor. Further, a shaft of the rotor is mutually coupled with the frame body through a coupler to prevent a relative rotation between them. Then, a machine tool machines a mounting surface of the frame body which is to be in direct contact with a surface of an object on which the motor is mounted, while integrally rotating the frame body, the stator, and the rotor forming the motor about an axis of the rotor.

Further, in order to achieve the above objects, a motor according to the present invention includes a stator having a stator core with a winding wound thereon, a rotor having a rotor core secured to a shaft, and a front frame and a rear frame forming a motor frame body to fixedly hold the stator core therebetween in an axial direction. Further, through the method of machining according to the present invention, machining is made to a mounting surface of the front frame, which is to be in direct contact with a surface of an object on which the motor is mounted. In addition, the front frame and the rear frame respectively have a central opening having an inner diameter smaller than an outer diameter of the rotor, and a front bearing and a rear bearing are directly accommodated in the central openings to support the shaft of the rotor rotatably about the frame body through the front bearing and the rear bearing, thereby rotatably supporting the rotor by the front frame and the rear frame while forming a fine clearance between an outer peripheral surface of the rotor core and an inner peripheral surface of the stator core.

According to the present invention, after the stator and the rotor are incorporated into the motor frame body, the rotor and the frame body are fixedly coupled, and a finish is made to the mounting surface of the frame body with reference to the rotor axis. It is thereby possible to finish the mounting surface of the frame body without loss of the motor assembling workability while reducing misalignment between the stator axis and the rotor axis as substantially as possible. Therefore, an output shaft of the motor and a driven body are mutually aligned accurately to achieve a highly accurate coupling, thereby providing a machine driving structure having high reliability of the operation. Further, there is provided a motor with a frame body having a simplified structure in which the method of finishing according to the present invention is used. As a result, it is possible to reduce the number of parts and the number of steps in assembly.

BEST MODE FOR EMBODYING THE INVENTION

Figure 1:
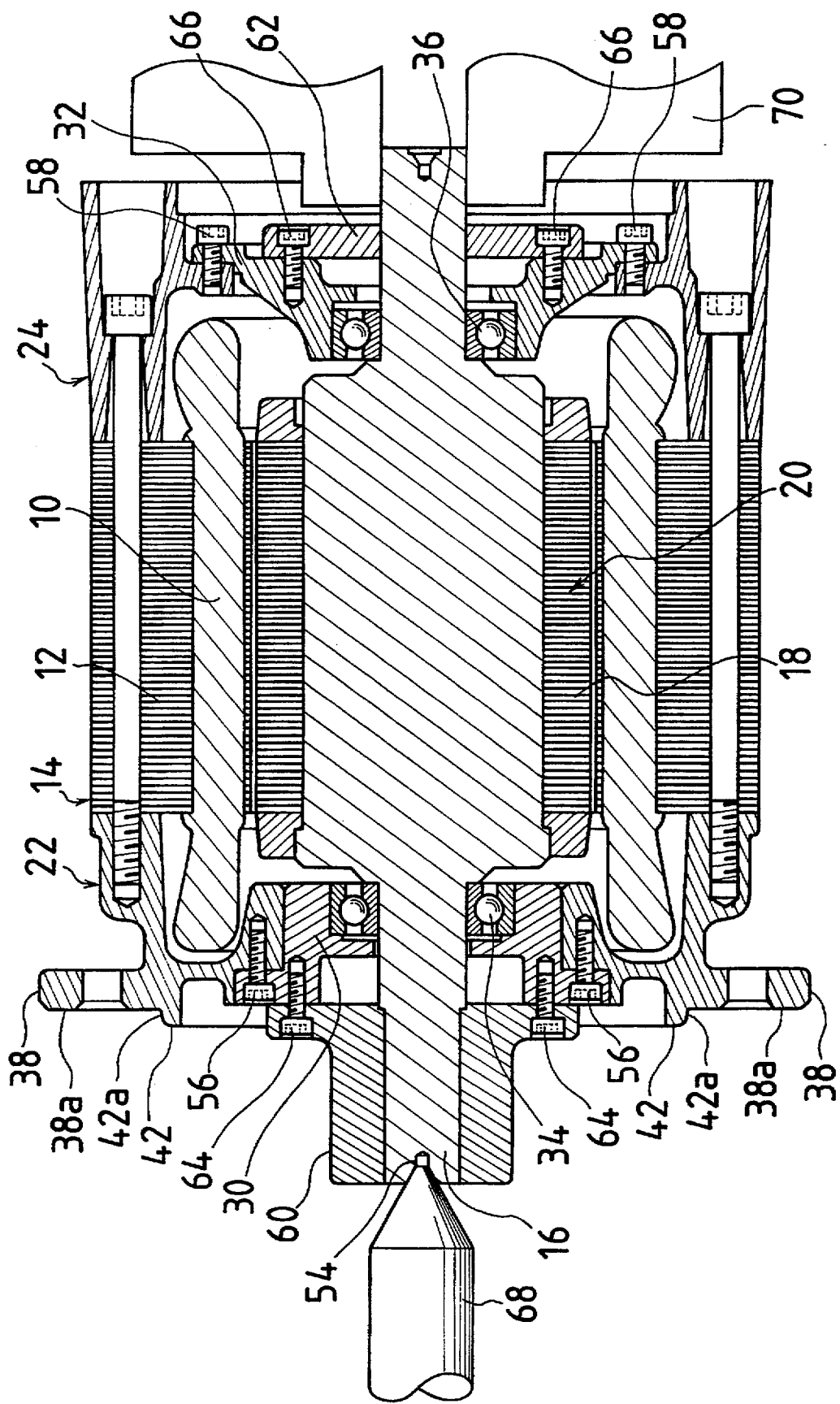
FIG. 1 is a sectional view showing a state in which a frame body of a motor is machined according to a method of machining of the present invention.

Referring to FIG. 1, a description will now be given of one embodiment in which a motor frame body is finished through a method of machining according to the present invention.

Figure 2:
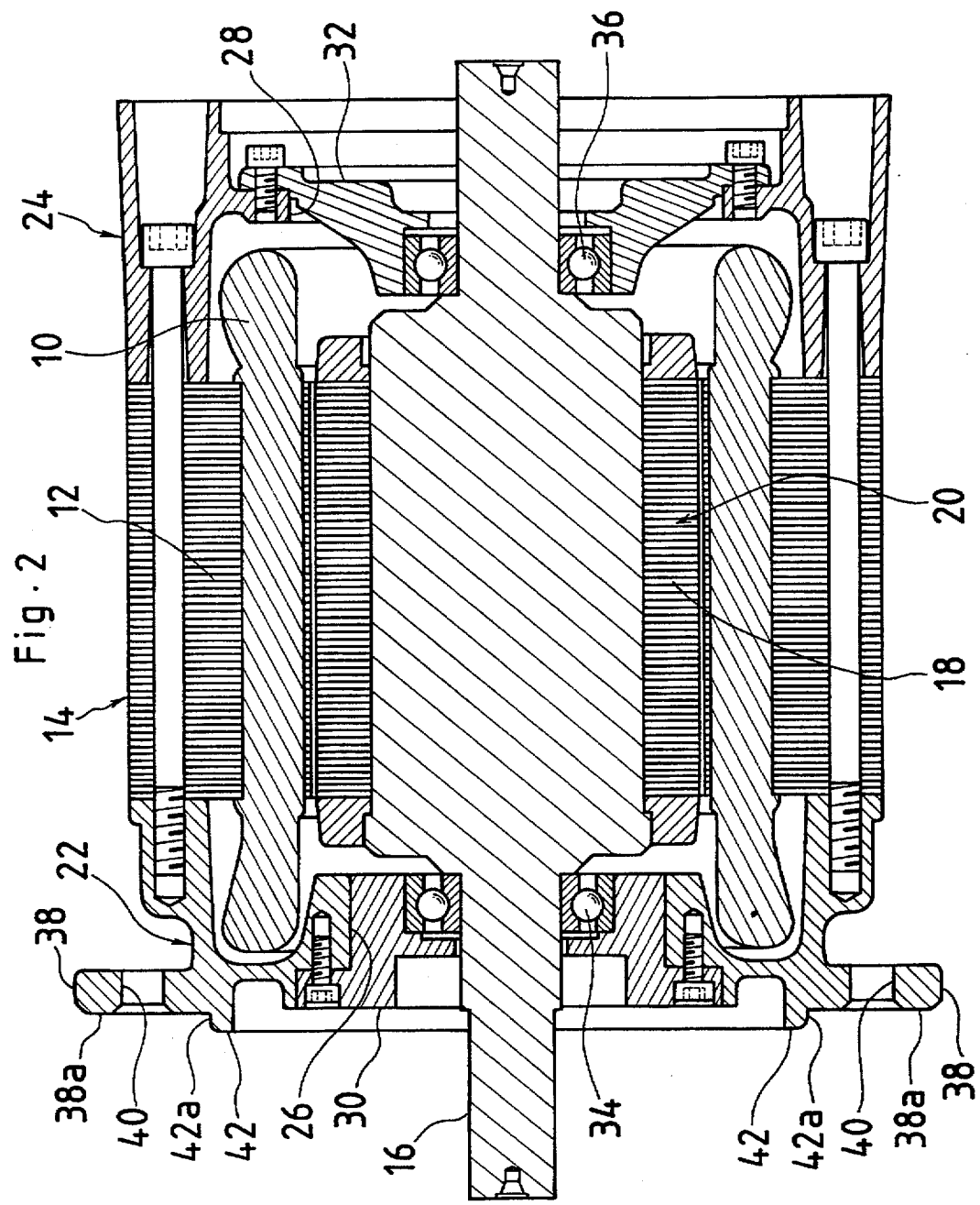
FIG. 2 is a sectional view showing a state in which component parts forming the motor of FIG. 1 are assembled.
Figure 3:
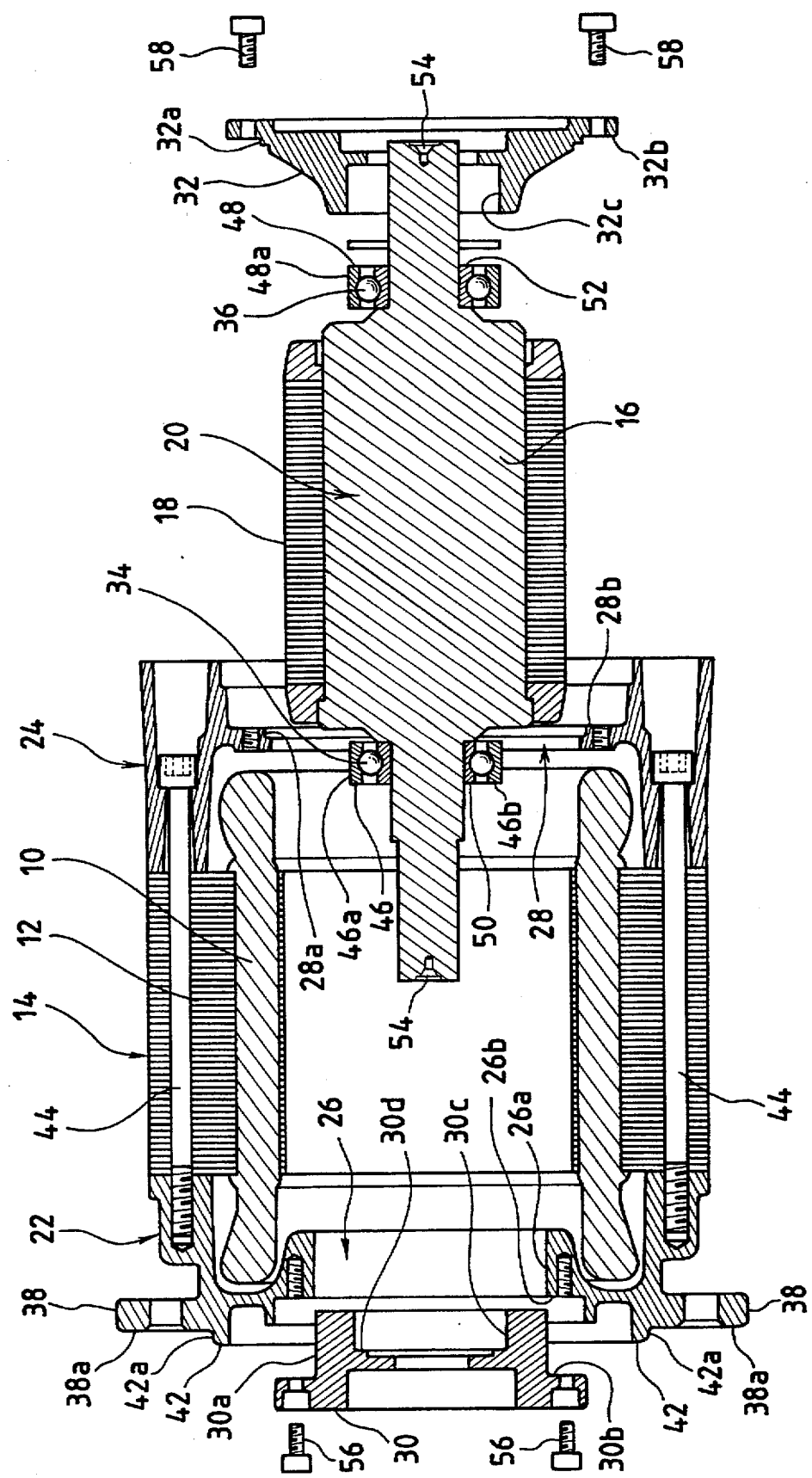
FIG. 3 is a sectional view showing the component parts forming the motor of FIG. 1 in the process of assembling.

A motor shown in FIG. 1 has substantially the same structure as that shown in FIG. 2 (and FIG. 3), and the same reference numerals are used for component parts identical with those in FIG. 2. Thus, descriptions of parts forming the motor of FIG. 1 are omitted.

First, a general description will be given of the method of finishing the motor frame body. As shown in FIG. 1, a stator 14, both bearing housings 30, 32, and a rotor 20 are incorporated into the frame body (a front frame 22 and a rear frame 24), thereby assembling the motor. Subsequently, a mounting surface of the front frame 22 is finished while integrally rotating the stator 14, the front frame 22, the rear frame 24, both the bearing housings 30, 32, and the rotor 20 about a rotor axis.

Next, the method of finishing will be described in detail.

The component parts forming the motor are first assembled into the motor according to a known method. That is, first, the front bearing housing 30 is fitted into a central opening 26 in the front frame 22 with a clearance to be fixed to the front frame 22 through bolts 56. Subsequently, the rotor 20 is inserted into the stator 14 from the side of the rear frame 24 to mount a front bearing 34 fixed to a shaft 16 on the front bearing housing 30 with a clearance fit. After that, while mounting a rear bearing 36 fixed to the shaft 16 on the rear bearing housing 32 with a clearance fit, the rear bearing housing 32 is fitted into a central opening 28 in the rear frame 24 with a clearance fit to be fixed to the rear frame 24 through bolts 58.

For the next step, ring plate-like couplers 60 and 62 are used to fixedly couple the shaft 16 with the front bearing housing 30 and the rear bearing housing 32. At this time, the respective couplers 60, 62 are fixed to a front end portion and a rear end portion of the shaft 16 through, for example, shrinkage fit, and are fixed on both the bearing housings 30, 32 through a plurality of bolts 64, 66. Thereby, a stator axis and a rotor axis are held in conformity with each other.

In the motor equipped with the couplers 60, 62 as described above, a front end of the shaft 16 is supported at a center hole 54 by a tail-stock 68, and an outer peripheral surface of a rear end thereof is supported by a chuck 70, thereby mounting the motor on a lathe. Further, while integrally rotating the stator 14, the rotor 20, the front frame 22, the rear frame 24, the front bearing housing 30 and the rear bearing housing 32 about the rotor axis, a finish is made to an axial front end surface 38a of a flange 38 of the front frame 22 and a radial outer peripheral surface 42a of a socket portion 42. Finally, after the bolts 64, 66 are removed, the couplers 60, 62 are removed from the shaft 16 by using a drawing tool such as gear puller to release a fixed state of the rotor 20, resulting in completion of assembly of the motor.

According to the above procedure for finish, before the finish is made to mounting surfaces, the front frame 22 and the rear frame 24 are respectively fixed to the front bearing housing 30 and the rear bearing housing 32. Thus, even when both of them are respectively fitted with a clearance fit, no misalignment is caused due to the fine clearances between the stator axis and the rotor axis after the finish (that is, after removal of the couplers 60, 62). In this case, only fine clearances between both the bearing housings 30, 32 and both the bearings 34, 36 may have an effect on the misalignment between the stator axis and the rotor axis after the finish. Thus, it is possible to improve alignment accuracy between the shaft 16 and a driven body when the motor is mounted on an object without loss of motor assembling workability. As a result, in particular, when the motor is used as a direct-coupled motor in which the shaft 16 is directly coupled to a main spindle (not shown) of a machine tool, accurate centering is made between the shaft 16 and the main spindle. It is thereby possible to enhance reliability of the operation of the machine.

The embodiment has been described with respect to the motor of type in which the rotor is inserted into the stator fixed to the front frame and the rear frame from the side of the rear frame. However, it is to be noted that the method of the present invention may be applied to another type of motor in which a rotor is inserted from the opposite side, i.e., the side of the front frame.

Figure 4:
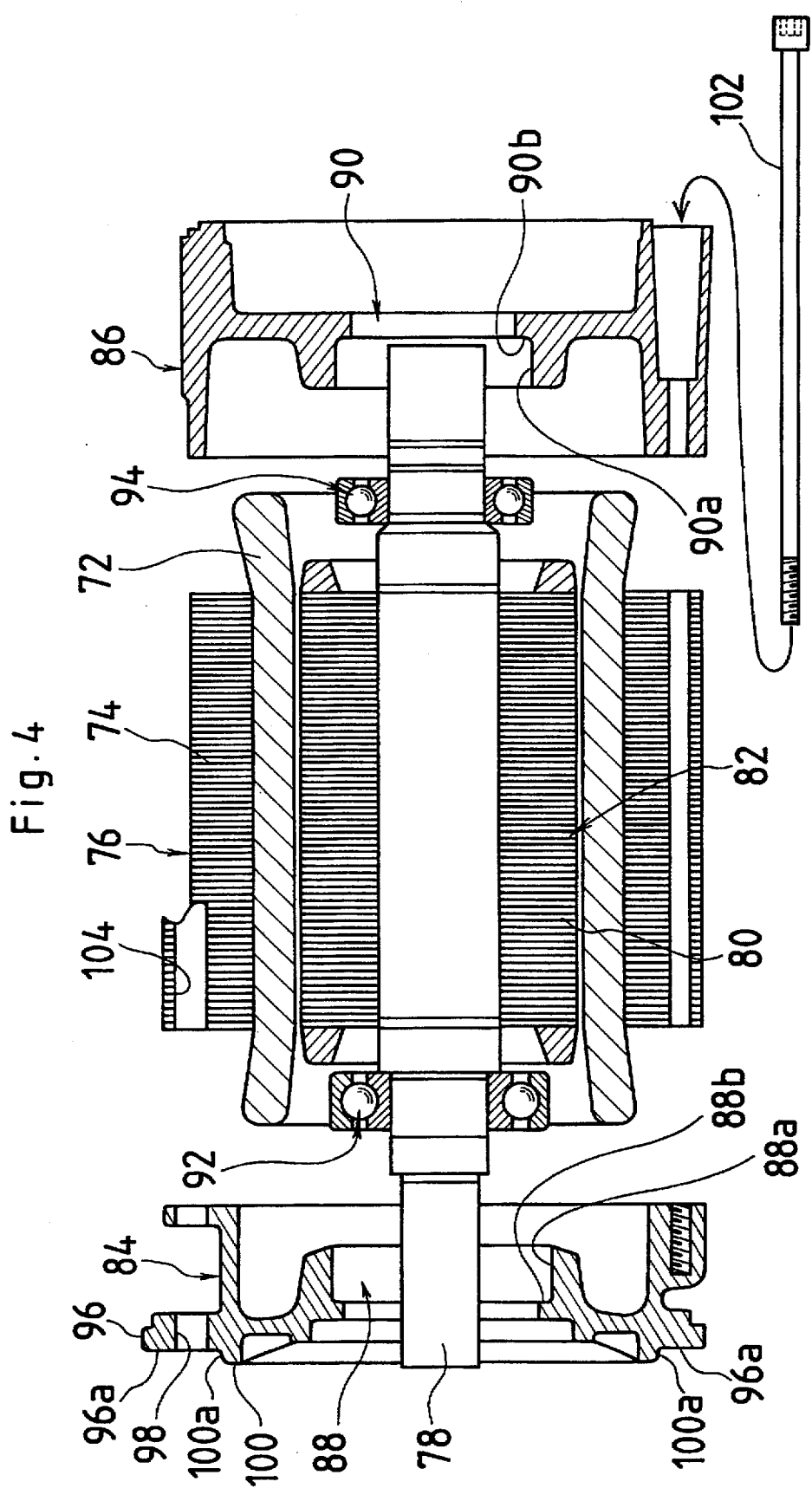
FIG. 4 is a sectional view showing a structure of a motor according to a modification of FIG. 1, in which a method of finishing according to the present invention can be used, and showing component parts in the process of assembling.

Next, referring to FIGS. 4 and 5, a description will be given of a motor having a form different from that shown in FIG. 1, for which the above method of finishing the frame body according to the present invention is applied.

First, a general description will be given of the motor. A front frame 84 and a rear frame 86 are disposed at axial ends of a stator 76, and are provided with central openings respectively having a smaller diameter than an outer diameter of a rotor 82. Thus, the motor is characterized in that, unlike the rear frame 24 shown in FIGS. 2 and 3, an inner diameter larger than the outer diameter of the rotor is not formed in any one of the front frame 84 and the rear frame 86.

The method of the present invention as described above referring to FIG. 1 is used for a finish of a frame body (the front frame 84). That is, after the stator 76 is mounted on the frame body (the front frame 84 and the rear frame 86), the rotor 82 is mounted on the frame body, and a shaft 78 of the rotor 82 and the frame body are fixedly coupled with each other. In this state, the finish is made to a mounting surface of the frame body (the front frame 84) while integrally rotating the frame body, the stator 76 and the rotor 82 about a rotor axis.

A detailed description will now be given of a structure of the motor, and a method of finishing the motor frame body.

The motor includes the stator 76 having a stator core 74 with a winding 72 wound thereon, the rotor 82 having a rotor core 80 secured to the shaft 78, and the front frame 84 and the rear frame 86 to fixedly hold the stator core 74 therebetween in an axial direction. In the front frame 84 and the rear frame 86 forming the frame body, a front bearing 92 and a rear bearing 94 are directly (that is, through no bearing housing) accommodated in central openings 88 and 90 therein, and the shaft 78 is rotatably supported through the front bearing 92 and the rear bearing 94. Thereby, the rotor 82 is rotatably supported by the front frame 84 and the rear frame 86 while forming a fine clearance between an outer peripheral surface of the rotor core 80 and an inner peripheral surface of the stator core 74.

Figure 5:
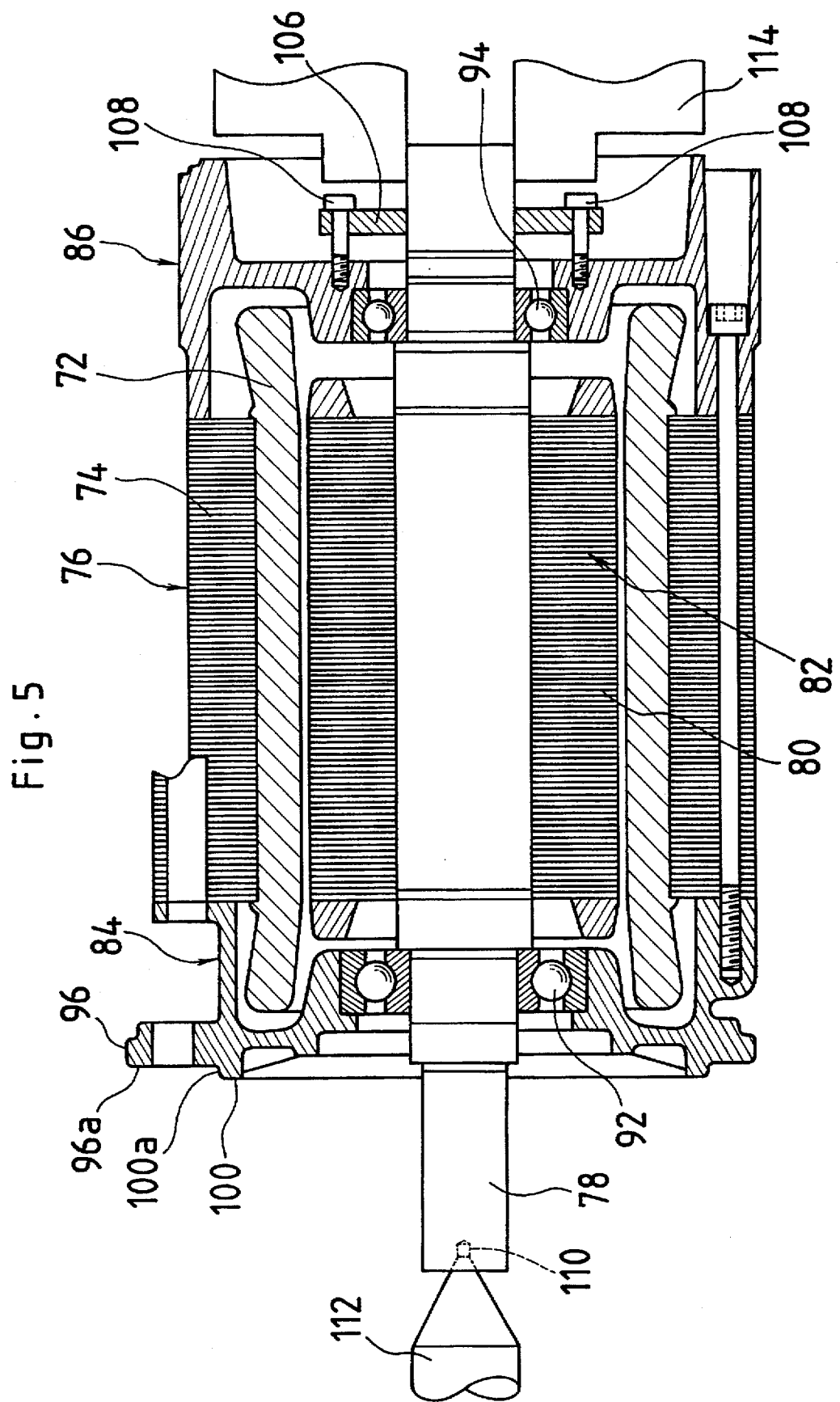
FIG. 5 is a sectional view showing a state in which the motor of FIG. 4 is assembled, and a finish is made according to the method of the present invention.

In the motor shown in FIG. 5, the central openings 88 and 90 in the front frame 84 and the rear frame 86 respectively have central openings having an inner diameter smaller than the outer diameter of the rotor 82. Therefore, in the motor assembling process, as shown in FIG. 4, the rotor 82, securing the front bearing 92 and the rear bearing 94 to the vicinity of both ends of the shaft 78 is first inserted, into the stator 76. Then, while inserting the front bearing 92 and the rear bearing 94 into the front frame 84 and the rear frame 86, the stator 76 is fixed to the front frame 84 and the rear frame 86.

The front frame 84 disposed on the side of a load of the shaft 78 is provided with a flange 96 radially outwardly extending at an outer peripheral portion thereof on the side (on the front side) opposed to the side opposed to the stator core 74. The flange 96 has a through-hole 98 through which a bolt (not shown) for mounting the motor on an object passes. Further, the front frame 84 includes a cylindrical socket portion 100 axially forwardly extending over the flange 96 for a relative alignment (for example, centering) of the shaft 78 with a driven body. FIGS. 4 and 5 are sectional views in which the motor is shown asymmetrically with respect to a rotor axis. As seen from the drawings, in the motor, the through-hole 98 in the flange 96 of the front frame 84, and a plurality of tie-bolts 102 for fixing the stator 76 to the front frame 84 and the rear frame 86 are disposed with circumferential misalignment. Further, a part of a coolant passage 104 is shown on the upper side of the drawings.

In the motor having the above structure, according to the following procedures, a finish is made to a mounting surface including an axial front end surface 96a of the flange 96 of the front frame 84 and a radially outer peripheral surface 100a of the socket portion 100.

First, prior to the finish of the mounting surface of the frame body, a finish is made to the front frame 84 and the rear frame 86 with reference to each axis of the front frame 84 and the rear frame 86. That is, a finish is made to an inner peripheral surface 88a of the central opening 88 in the front frame 84 to support the front bearing 92 and a mounting end surface 88b in the vicinity of the opening, and an inner peripheral surface 90a of the central opening 90 in the rear frame 86 to support the rear bearing 94 and a mounting end surface 90b in the vicinity of the opening. Concurrently, a screw hole and a through-hole to receive the tie-bolts 102 are respectively formed in the front frame 84 and the rear frame 86. It is thereby possible to concentrically dispose the front bearing 92 and the rear bearing 94 at a time of motor assembly. Further, before the finishing of the mounting surface of the frame body, rough machining is preferably made to the axial front end surface 96a of the flange 96 of the front frame 84, and the radial outer peripheral surface 100a of the socket portion 100.

Subsequently, while inserting the front bearing 92 and the rear bearing 94 secured to the shaft 78 of the rotor 82 inserted in advance into the stator 76 into the front frame 84 and the rear frame 86, the stator 76 is fixed to the front frame 84 and the rear frame 86 through a plurality of tie-bolts 102. Next, the shaft 78 is fixedly coupled with the rear frame 86 through a coupler 106. At this time, the coupler 106 is fixed to a rear end portion of the shaft 78 through, for example, shrinkage fit, and is fixed to the rear frame 86 through a plurality of bolts 108. Thereby, a stator axis and a rotor axis are held in conformity with each other.

In the motor equipped with the coupler 106 as described above, a front end of the shaft 78 is supported at a center hole 110 by a tail-stock 112, and a peripheral surface of a rear end thereof is supported by a chuck 114, thereby mounting the motor on a lathe. Further, while integrally rotating the stator 76, the rotor 82, the front frame 84 and the rear frame 86 about the rotor axis, a finish is made to the axial front end surface 96a of the flange 96 of the front frame 84 and the radial outer peripheral surface 100a of the socket portion 100. Finally, after the bolts 108 are removed, the coupler 106 is removed from the shaft 78 to release a fixed state of the rotor 82.

As set forth above, in the motor according to the present invention, the rotor 82 and the frame body (the front frame 84, the rear frame 86) are coupled with each other through no bearing housing (see the bearing housings 30, 32 in FIG. 2). As a result, it is possible to reduce the number of parts and the number of steps in the assembly, and to provide a higher accuracy of the finish of the mounting surface with reference to the rotor axis.

Meanwhile, it is known that sufficient strength may be provided by using only one coupler 106 for fixedly coupling the shaft 78 of the rotor 82 with the frame bodies 84, 86 as shown in the embodiment of FIG. 5. Further, though the coupler 106 may have various shapes and dimensions, in case of using a ring plate-like coupler, the coupler 106 may preferably be thin-walled in a range in which no rigidity is lost so that the coupler may be disposed accurately concentrically with the rotor axis. If the motor is, for example, a servomotor, it is also possible to apply a rotation detecting gear generally mounted at a rear end of the rotor shaft 78 to the coupler.

We claim:

1. A method of machining a motor frame body comprising the steps of:

fixing a stator to the frame body, and rotatably mounting a rotor to the frame body through bearings, thereby assembling the component parts into the motor;

mutually coupling a shaft of the rotor with the frame body through couplers to prevent a relative rotation therebetween; and machining through a machine tool a mounting surface of the frame body, which is to be in direct contact with a surface of an object on which the motor is mounted, while integrally rotating the frame body, the stator, and the rotor about an axis of the rotor shaft thereby forming the mounting surface about the axis of the rotor shaft.

2. A method of machining a motor frame body according to claim 1, wherein a coupler used in the coupling step is fixedly fitted with the shaft of the rotor, and the coupler and a part of the frame body are mutually fixed through a fixture, thereby mutually coupling the shaft of the rotor with the frame body so as to prevent a relative rotation therebetween.

3. A method of machining a motor frame body according to claim 1, wherein the frame body includes a front frame and a rear frame, the bearings are fixed to the front side and the rear side of the rotor before the rotor is mounted on the frame body, and the rotor is mounted on the frame body in the fixing step by mounting the front bearing directly on the front frame through a front bearing housing, and mounting the rear bearing directly on the rear frame through a rear bearing housing.

4. A method of machining a motor frame body according to claim 1, wherein the couplers used in the coupling step are fixedly fitted to a front end and a rear end of the shaft of the rotor, and the one coupler and the other coupler are respectively mutually fixed to a front bearing housing and a rear bearing housing through fixtures such as bolts, thereby mutually coupling the shaft of the rotor with the front frame, and the shaft of the rotor with the rear frame so as to prevent a relative rotation between them.

5. A method of machining a motor frame body according to claim 2 or 4, wherein the coupler is fixedly fitted to the shaft of the rotor through shrinkage fit.

6. A method of machining a motor frame body according to claim 1, wherein the machine tool in the machining step is a lathe, an outer peripheral surface of one end of the shaft of the rotor is supported by a chuck of the lathe, and the other end of the shaft of the rotor is supported by a tail-stock at a center hole formed therein, thereby machining the mounting surface of the frame body of the other end side of the shaft of the rotor.

* * * * *